(12) United States Patent
Krull

(10) Patent No.: US 9,358,485 B2
(45) Date of Patent: Jun. 7, 2016

(54) HYDRAULIC SPIN-ON FILTER CARTRIDGE HAVING BASE PLATE SUPPORTING RADIALLY DIRECTED SEAL

(75) Inventor: Timothy L. Krull, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 791 days.

(21) Appl. No.: 13/557,682

(22) Filed: Jul. 25, 2012

(65) Prior Publication Data

US 2013/0043181 A1 Feb. 21, 2013

Related U.S. Application Data

(60) Provisional application No. 61/525,291, filed on Aug. 19, 2011.

(51) Int. Cl.
*B01D 27/08* (2006.01)
*B01D 35/30* (2006.01)

(52) U.S. Cl.
CPC .............. *B01D 35/306* (2013.01); *B01D 27/08* (2013.01); *B01D 2201/347* (2013.01)

(58) Field of Classification Search
CPC ........ B01D 29/58; B01D 29/96; B01D 35/30; B01D 46/0005; B01D 2201/291; B01D 2201/295; B01D 2272/022; B01D 2272/027; B01D 27/08; B01D 35/306; B01D 2201/34; B01D 2201/345; B01D 2201/347; B01D 2271/022; B01D 2271/027; B01D 2271/08
USPC .................. 210/440, 443, 445, 450, 451, 455
See application file for complete search history.

(56) References Cited

U.S. PATENT DOCUMENTS

| | | | |
|---|---|---|---|
| 3,232,437 A | 2/1966 | Hultgren | |
| 4,369,113 A | 1/1983 | Stifelman | |
| 4,419,234 A | 12/1983 | Miller et al. | |
| 4,743,374 A | 5/1988 | Stifelman | |
| 5,080,787 A | 1/1992 | Brown et al. | |
| 5,104,537 A * | 4/1992 | Stifelman et al. | 210/440 |
| 5,180,490 A | 1/1993 | Eihusen et al. | |
| 5,476,585 A | 12/1995 | Mills | |
| 5,490,930 A | 2/1996 | Krull | |
| 5,685,985 A | 11/1997 | Brown et al. | |
| 5,695,637 A | 12/1997 | Jiang et al. | |
| 5,702,602 A | 12/1997 | Brown et al. | |
| 5,738,785 A | 4/1998 | Brown et al. | |
| 5,753,120 A | 5/1998 | Clausen et al. | |
| 5,766,468 A | 6/1998 | Brown et al. | |
| 5,858,227 A | 1/1999 | Stone et al. | |
| 5,885,447 A | 3/1999 | Theisen et al. | |
| 5,904,357 A | 5/1999 | Demirdogen et al. | |
| 5,906,736 A | 5/1999 | Bounnakhom et al. | |
| 5,984,109 A | 11/1999 | Kanwar et al. | |

(Continued)

FOREIGN PATENT DOCUMENTS

| | | |
|---|---|---|
| EP | 0 278 771 A1 | 8/1988 |
| EP | 0 806 564 A1 | 11/1997 |

(Continued)

*Primary Examiner* — Joseph Drodge
(74) *Attorney, Agent, or Firm* — Reinhart Boerner Van Deuren P.C.

(57) ABSTRACT

A filter element is provided. The filter element is removably engaged with a filter head having an inlet and an outlet. The filter element includes an outer housing, a filter cartridge, and a baseplate. The filter element further includes a plurality of seals adapted to seal between the baseplate and the filter head, and between the baseplate and the filter cartridge.

26 Claims, 4 Drawing Sheets

(56) References Cited

U.S. PATENT DOCUMENTS

| | | | |
|---|---|---|---|
| 5,988,399 A | 11/1999 | Brown et al. | |
| 5,996,810 A | 12/1999 | Bounnakhom et al. | |
| 6,019,229 A | 2/2000 | Rao | |
| 6,045,693 A | 4/2000 | Miller et al. | |
| 6,099,729 A | 8/2000 | Cella et al. | |
| 6,227,381 B1 | 5/2001 | Koivula | |
| 6,478,958 B1 | 11/2002 | Beard et al. | |
| 6,499,605 B1 | 12/2002 | Koivula | |
| 6,508,932 B1 | 1/2003 | Mueller et al. | |
| 6,554,139 B1 | 4/2003 | Maxwell et al. | |
| 6,554,140 B2 | 4/2003 | Steger, Jr. et al. | |
| 6,610,203 B1 | 8/2003 | Jainek | |
| 6,615,989 B2 * | 9/2003 | Brown et al. | 210/443 |
| 6,626,299 B1 | 9/2003 | Brown et al. | |
| 6,695,966 B1 | 2/2004 | Sakraschinsky et al. | |
| 6,752,924 B2 | 6/2004 | Gustafson et al. | |
| 6,758,980 B2 | 7/2004 | Prater et al. | |
| 6,787,033 B2 | 9/2004 | Beard et al. | |
| 6,823,996 B2 | 11/2004 | Durre | |
| 7,413,090 B2 | 8/2008 | Crawford et al. | |
| 7,628,280 B2 | 12/2009 | Mandt et al. | |
| 7,744,758 B2 * | 6/2010 | Dworatzek et al. | 210/235 |
| 2002/0017497 A1 | 2/2002 | Fritze | |
| 2002/0125188 A1 | 9/2002 | Hacker et al. | |
| 2002/0152732 A1 | 10/2002 | Kallsen et al. | |
| 2003/0127384 A1 | 7/2003 | Kapur | |
| 2004/0079693 A1 | 4/2004 | Hacker et al. | |
| 2004/0182777 A1 | 9/2004 | Stankowski et al. | |
| 2005/0000885 A1 | 1/2005 | Stockbower | |
| 2005/0224407 A1 | 10/2005 | Hacker | |
| 2006/0054547 A1 | 3/2006 | Richmond et al. | |
| 2006/0137316 A1 | 6/2006 | Krull et al. | |
| 2006/0157403 A1 | 7/2006 | Harder et al. | |
| 2007/0102336 A1 | 5/2007 | Komine et al. | |
| 2007/0108119 A1 * | 5/2007 | Mandt | B01D 27/08 210/424 |
| 2007/0138078 A1 | 6/2007 | Durre | |
| 2007/0209992 A1 * | 9/2007 | Johnson et al. | 210/232 |
| 2008/0142426 A1 | 6/2008 | Greco et al. | |
| 2009/0114585 A1 | 5/2009 | Mandt et al. | |
| 2009/0145826 A1 * | 6/2009 | Calcaterra et al. | 210/137 |

FOREIGN PATENT DOCUMENTS

| | | |
|---|---|---|
| EP | 1 201 289 A1 | 5/2002 |
| EP | 2 340 883 A2 | 7/2011 |
| FR | 2 818 917 A1 | 7/2002 |
| KR | 10 2005 0007345 A | 1/2005 |
| WO | WO 02/089949 A1 | 11/2002 |
| WO | WO 2005/099861 A1 | 10/2005 |
| WO | WO 2006/012031 A1 | 2/2006 |
| WO | WO 2006/071926 A2 | 7/2006 |
| WO | WO 2007/075866 A1 | 7/2007 |

* cited by examiner

HYDRAULIC SPIN-ON FILTER CARTRIDGE HAVING BASE PLATE SUPPORTING RADIALLY DIRECTED SEAL

CROSS-REFERENCE TO RELATED PATENT APPLICATIONS

This patent application claims the benefit of U.S. Provisional Patent Application No. 61/525,291, Aug. 19, 2011, the entire teachings and disclosure of which are incorporated herein by reference thereto.

FIELD OF THE INVENTION

This invention generally relates to liquid filter arrangements, and more specifically to replaceable liquid filtration elements.

BACKGROUND OF THE INVENTION

Systems utilizing fluid such as oil or other lubricating fluids often require the use of a filter. A filter is adapted to remove contaminants and impurities from the fluid. It is often desirable to have a filter element configured such that it may be easily replaced during periodic servicing. It is necessary for the replaceable portion of the filter to seal with non-replaceable portions. As such, a suitable arrangement of seals is provided to prevent fluid from bypassing the filter media of the filter element. If the fluid were permitted to bypass the filter media, the fluid would not be filtered rendering the filter element useless.

The invention provides improvements over the current state of the art over filters and filter elements.

BRIEF SUMMARY OF THE INVENTION

In one aspect, the invention provides a filter element. The filter element is adapted to removably engage a filter head having an inlet and an outlet. The filter element has an inlet side in fluid communication with the inlet, and an outlet side in fluid communication with the outlet. The filter element comprises an outer housing, a filter cartridge, and a baseplate having a one-piece construction. The filter cartridge includes a closed end cap, an open end cap having a central aperture, and filter media extending therebetween. The filter media is arranged around and along a longitudinal axis such that it defines an inner cavity. An outer cavity is defined between an outer peripheral surface of the filter media and the outer housing. The inlet side includes the outer cavity, and the outlet side includes the inner cavity. The baseplate and the filter cartridge are non-removably secured within the outer housing.

The filter element further includes a first seal sealing between the open end cap and the baseplate, and a second seal adapted to seal between the baseplate and a first sealing surface of the filter head. The first and second seals are thus arranged to limit fluid communication between the inlet side and the outlet side when the filter element is installed on a filter head.

The filter element further includes a third seal, adapted to seal between the baseplate and a second sealing surface of the filter head. The third seal is adapted to limit fluid communication between the inlet side and an exterior of the outer housing when the filter element is installed on a filter head.

In a preferred embodiment, the filter element further includes a fourth seal, retained between the baseplate and the outer housing. The fourth seal is arranged to limit fluid communication between the inlet side and the exterior of the housing.

The baseplate defines a flow opening and at least one inlet port. Preferably, the flow opening extends axially through the central aperture of the open end cap. An outer peripheral surface of the flow opening provides a sealing surface for the first seal. Also preferably, the at least one inlet port is a plurality of inlet ports. The inlet ports are spaced around and radially outside the flow opening. Preferably, the inlet ports are in fluid communication with the outer cavity, and define the inlet side therewith. The flow opening is in fluid communication with the inner cavity, and defines the outlet side therewith.

The baseplate further defines a seal mount portion and an outer mounting portion. In a preferred embodiment, the seal mount portion extends axially away from the open and closed end caps, and defines an outwardly opening groove, adapted to retain the second seal.

Also in preferred embodiments, the outer mounting portion is adapted to removably engage the filter head. Preferably, the outer mounting portion is threaded, and is adapted to threadably engage the filter head. Also preferably, the outer mounting portion defines an inwardly opening groove, adapted to retain the third seal.

In some embodiments, the central aperture of the open end cap is surrounded by an axially depending portion. A radially inwardly extending portion is attached to an end of the axially depending portion, and defines a stepped configuration therewith. The stepped configuration is adapted to axially and radially support the first seal.

In some embodiments, the first flow opening is surrounded by an annular extending portion. The annular extending portion extends axially through the central aperture of the open end cap, such that a distal end of the annular extending portion is positioned axially between the open and closed end caps. The annular extending portion is further adapted to provide an axial sealing surface and a radial sealing surface for the first seal.

Thus in preferred embodiments, the filter element is adapted to filter fluid entering the outer cavity, travelling through the filter media, and out of the filter element through the inner cavity, in an "outside to inside" direction. The various seals arranged between the baseplate and the filter head, and between the baseplate and the outer housing attempt to prevent fluid from bypassing the filter media, and from leaking out of the filter element.

The baseplate further includes a retaining portion, which is adapted to non-removably secure the filter cartridge within the outer housing. In preferred embodiments, the retaining portion abuts the open end cap to retain the filter cartridge.

In another preferred embodiment, the outer housing defines a lip portion, which partially envelops the outer mounting portion of the baseplate. As such, the lip portion non-removably secures the baseplate within the outer housing.

The baseplate is securely retained by the lip of the outer housing, and in turn the baseplate securely retains the filter cartridge within the outer housing. As such, the filter element can be removed from a filter head in a single unit for the purposes of servicing or replacing.

In another aspect, a filter is provided. The filter includes the various preferred embodiments of the filter element of the first aspect discussed above, and further includes a filter head having an inlet and an outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
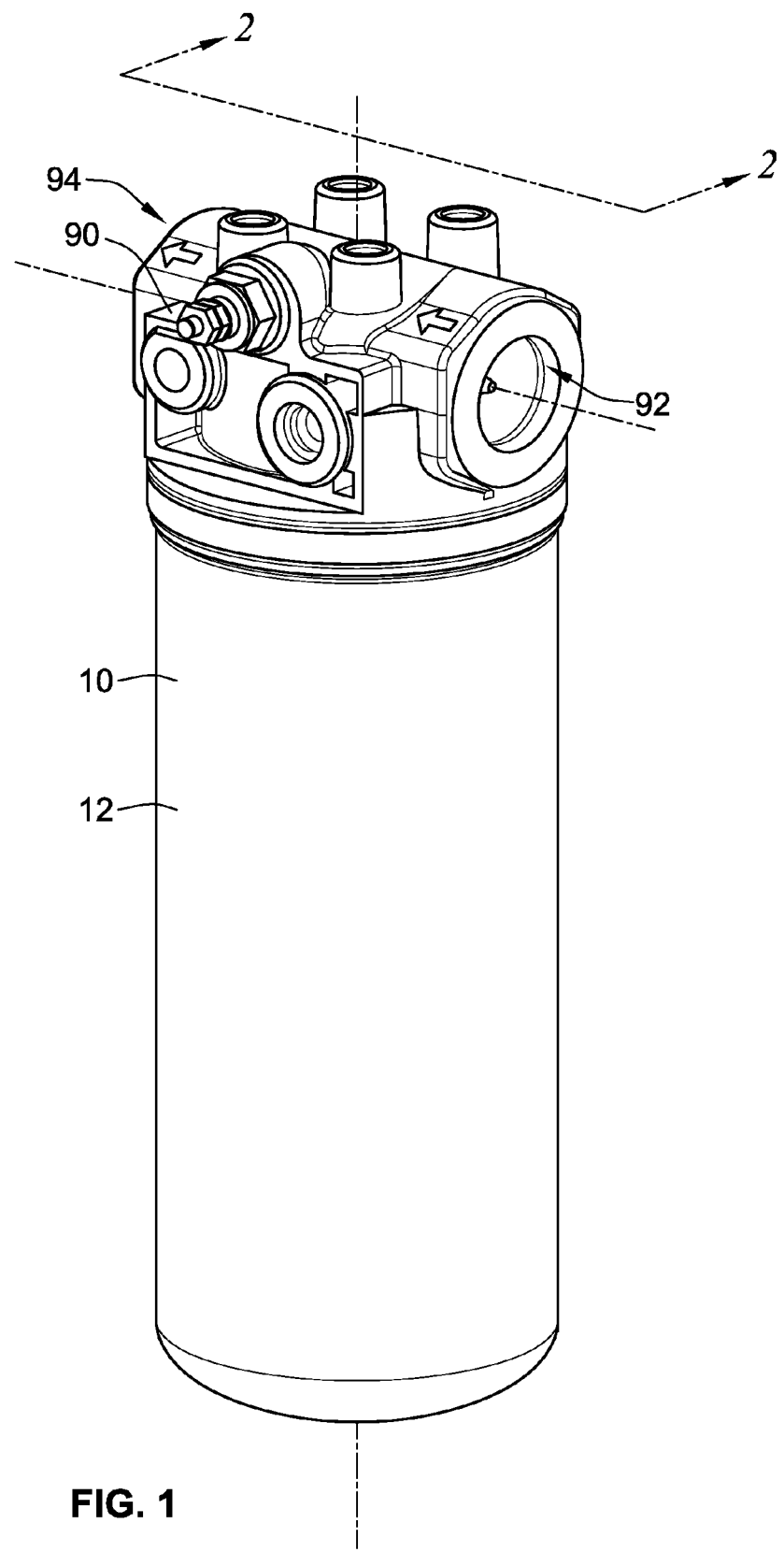
FIG. 1 is a perspective view of an embodiment of a filter having a filter head and a filter element according to the teachings of the present invention.
Figure 2:
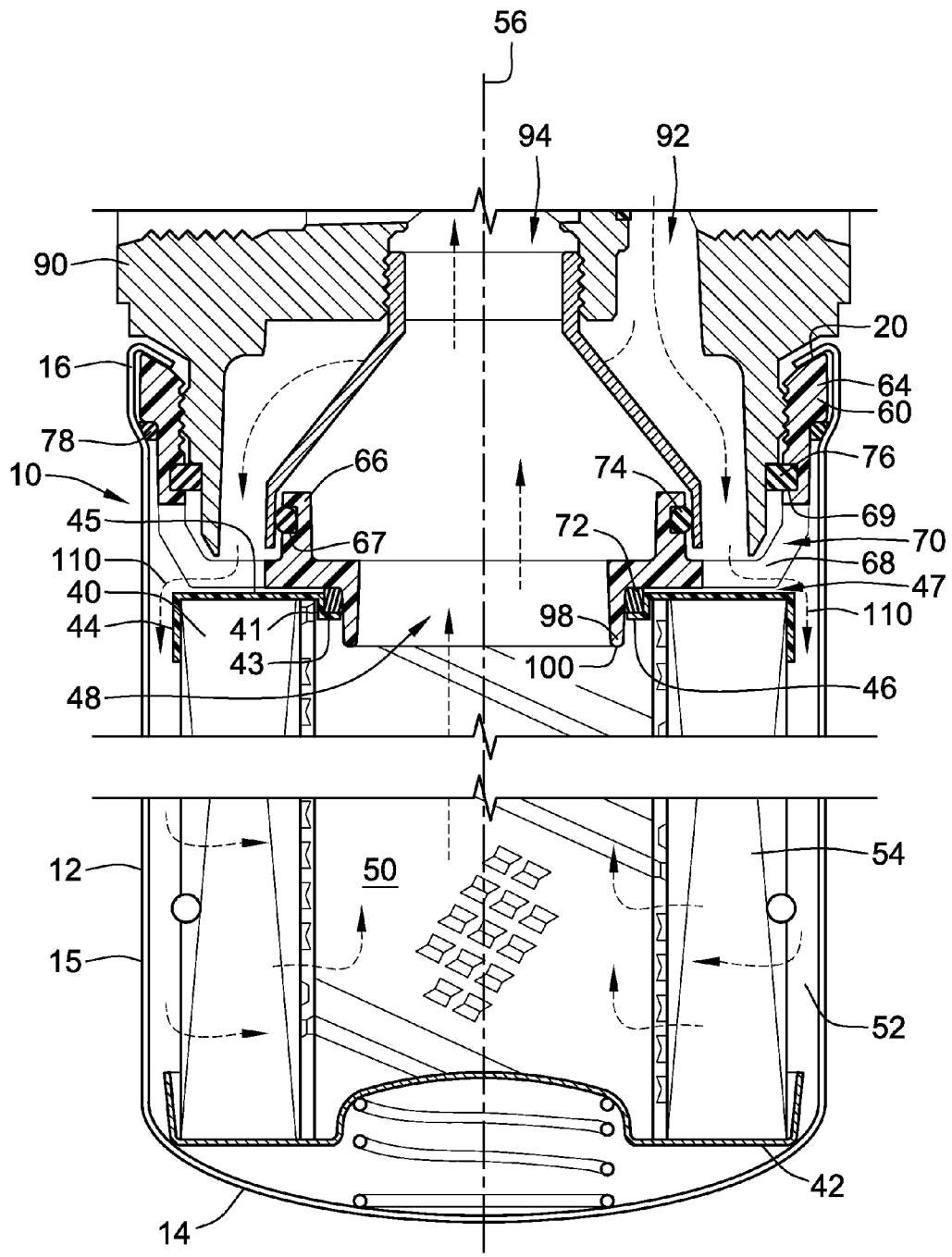
FIG. 2 is a partial cross-sectional view of the filter of FIG. 1.

FIGS. 1 and 2 illustrate an embodiment of a spin-on filter element 10. The filter element 10 is removably attached to a filter head 90, and is adapted to filter fluid flowing from an inlet 92, through the filter element 10, and then through an outlet 94. When it is desired that the filter element 10 be serviced or replaced, it may be threadably removed from the filter head 90, discarded, and then a new filter element 10 is threadably installed on the filter head 90.

The filter element 10 is comprised of an outer housing 12, a filter cartridge 40, and a baseplate 60. The filter cartridge 40 and the baseplate 60 are non-removably secured within the outer housing 12. The outer housing defines a closed end 14, an open end 16, and a generally annular sidewall 15 extending axially therebetween. The outer housing 12 is adapted to securely retain the baseplate 60 therein. In preferred embodiments, the outer housing 12 further defines a lip 20, proximate the open end 16. The lip 20 is adapted to securely retain the baseplate 60 within the outer housing 12 by providing an axial abutment abutting an axial end of and enveloping an outer peripheral surface of the baseplate 60.

The filter cartridge 40 is comprised of a closed end cap 42, an open end cap 44, and filter media 54. The filter media 54 is an annular tube that extends axially between the closed and open end caps 42, 44, and around and along a longitudinal axis 56, defining an inner cavity 50 therein. When the filter element 10 is assembled with the filter cartridge 40 positioned within the outer housing 12, an outer cavity 52 is formed radially between an outer periphery of the filter media 54 and an inner surface of the sidewall 15.

Figure 3:
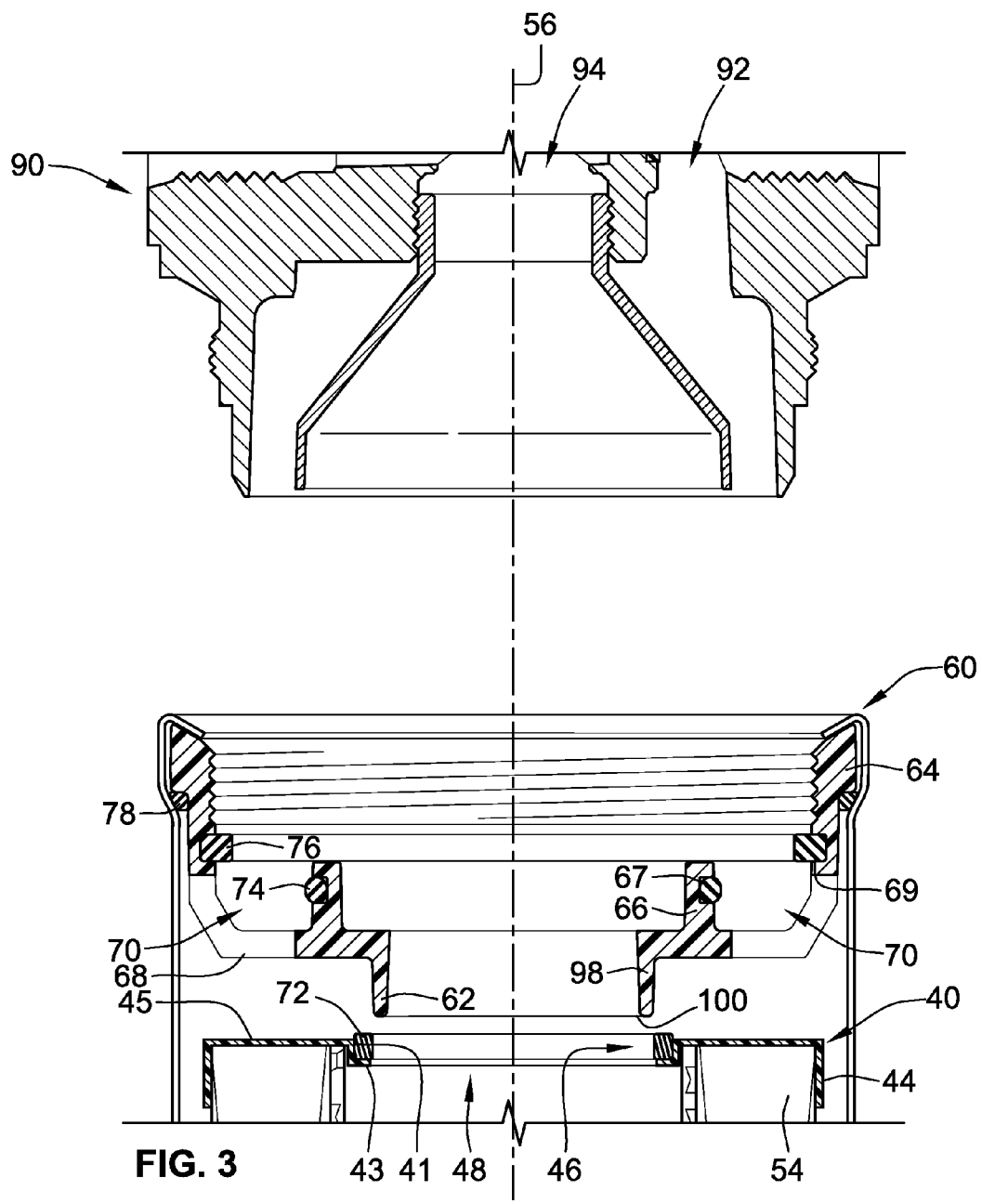
FIG. 3 is a partial exploded view of the filter of FIG. 1.
Figure 4:
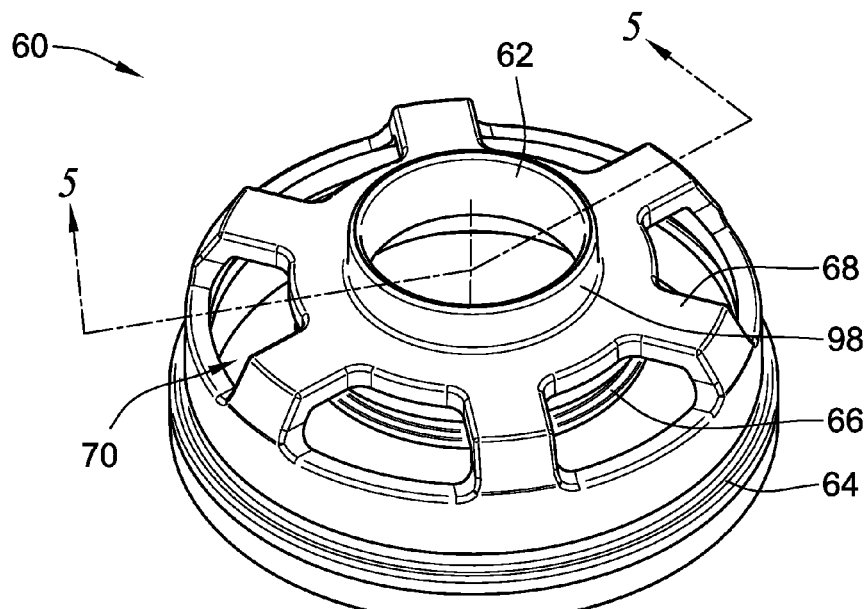
FIG. 4 is a perspective view of a baseplate used in the filter element of FIG. 1 carrying a plurality of seals.

With additional reference to FIG. 3, The open end cap 44 defines a central aperture 48 in fluid communication with the inner cavity 50. In a preferred embodiment, the central aperture 48 is surrounded by and/or defined by an axially depending portion 41. The axially depending portion 41 has a radially inwardly extending portion 43 attached thereto, proximate an end thereof forming a stepped configuration. The stepped configuration defines a shelf 46, which axially and radially supports and provides a sealing surface for a first seal 72, which seals with the baseplate 60.

With reference now to FIGS. 2-5, the structural details of the baseplate 60 are discussed. The baseplate 60 is a one-piece construction. A one-piece construction is meant to refer to a structure made out of a single piece of material. A body having a one-piece construction such as the baseplate 60 is typically molded or machined from a single piece of suitable material. The baseplate 60 is further made of a suitable rigid material, including but not limited to a rigid metal or plastic.

The baseplate 60, having a one-piece construction, is fully independent of the open end cap 44 in this embodiment. Independent in this context is intended to refer to two separate components that are nondestructively removable from each other. Nondestructively removable means that the components may be physically separated from each other without causing any damage to either. For example, absent the outer housing 12, the filter cartridge 40 and the baseplate 60 could be physically separated from each other without causing damage to either component, as illustrated in the partial exploded view in FIG. 3.

Figure 5:
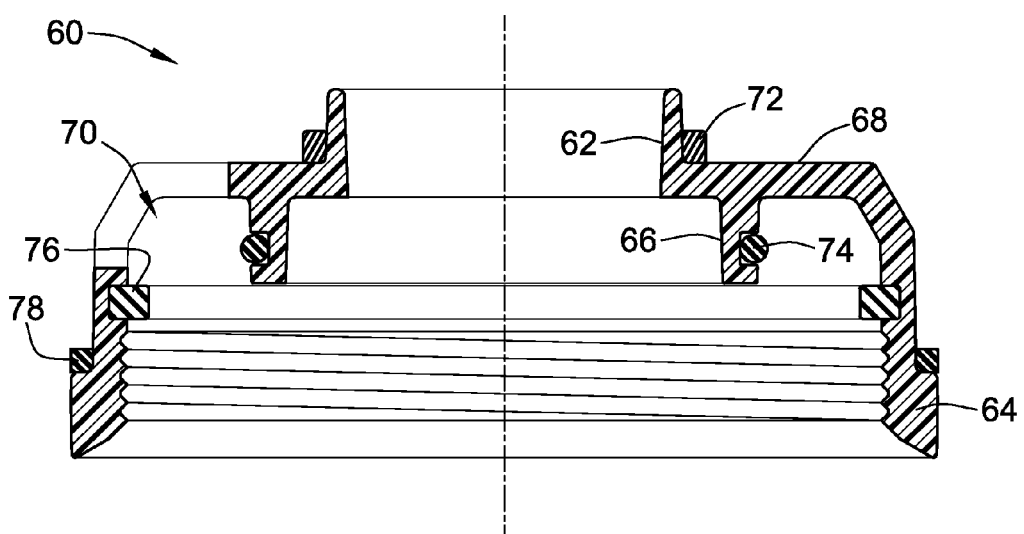
FIG. 5 is a cross-sectional view of the baseplate and seals of FIG. 4.

The baseplate 60 is comprised of a flow opening 62, a seal mount portion 66, a retaining portion 68, a plurality of inlet ports 70, and an outer mounting portion 64. The baseplate 60 is shown in FIGS. 2, 3 and 5 carrying or cooperating with a plurality of seals 72, 74, 76, and 78. However, the seals should be understood to be independent of the structure of the baseplate 60. The seals 72, 74, 76, and 78 are generally retained between and provide a seal between the baseplate 60 and other structures of the filter 10, as discussed in further detail below.

In preferred embodiments, the flow opening 62 is provided by an axially extending annular portion 98 (see FIG. 3). The annular portion 98 extends axially through the central aperture 48 of the open end cap 44 and into the internal cavity 50. As such, an axial distal end 100 of the annular portion 98 is axially recessed into the central cavity and axially interposed between the open and closed end caps 42, 44. The first seal 72 provides a seal between an outer peripheral surface of the annular portion 98 and the stepped portion 46 of the open end cap 44, preventing fluid bypass therebetween.

The seal mount portion 66 extends axially away from the filter cartridge 40 and provides a sealing surface for a radially outward directed second seal 74. In preferred embodiments, the seal mount portion 66 defines a radially outwardly opening annular groove 67, which is adapted to axially retain and radially support the second seal 74. The second seal 74 forms a radial seal with a radially inward directed sealing surface of the filter head 90 when the filter element 10 is installed thereon (see e.g. FIG. 2).

In a preferred embodiment, a retaining portion 68 of the baseplate 60 operably axially abuts an axially outward facing surface 45 of the open end cap 44. Further, because the baseplate 60 is permanently secured within the outer housing 12, the axial abutment between the retaining portion 68 and the open end cap 44 securely and permanently retains the filter cartridge 40 within the outer housing 12. In some embodiments, the first seal 72 has sufficient resiliency and flexibility that it is compressed during operation of the filter, and a gap 47 between the retaining portion 68 and the open end cap 44 is closed. In other embodiments, the first seal 78 may not be sufficiently resilient and flexible to allow the gap 47 to close. In these embodiments, the axial abutment of the seal 72 with the stepped configuration 46 and the retaining portion 68 permanently secures the filter cartridge 40 within the outer housing 12.

The retaining portion 68 extends radially between and integrally connects the annular portion 98 with the outer mounting portion 64. The annular portion 98 forms a central hub from which the retaining portion 68 radially outwardly extends in a spoke-like pattern. The spoke-like pattern defines the plurality of inlet ports 70, which define a flow path that permits inlet fluid to flow from the inlet 92 to the outer cavity 52, as indicated by flow arrow 110 (FIG. 2). In the illustrated embodiment, the baseplate 60 must be sealed to the filter cartridge 40 and, particularly, to the open end cap 44 to prevent fluid from undesirably bypassing between the inlet and outlet sides of the filter.

The outer mounting portion 64 is adapted to removably engage the filter head 90. In preferred embodiments, the outer mounting portion 64 defines a threaded region which is adapted to threadably engage the filter head 90. However, other removably engagable structures are contemplated, including fasteners and interlocking forms adapted to interlock with the filter head 90. The outer mounting portion 64 also defines a radially inwardly opening groove 69, which retains a third seal 76. This third seal 76 extends radially inward and radially seals against a sealing surface of the filter head 90, which faces radially outward. The third seal 76 prevents inlet fluid from flowing between the filter head 90 and the outer mounting portion 64, and leaking.

When the filter element 10 is mounted to the filter head 90, flow opening 62 is in operable fluid communication with the internal cavity 50 of the filter media 54 and with the outlet 94 in the filter head 90. This fluid path defines an outlet side of the filter element 10 and filter head 90. The inlet ports 70 are in operable fluid communication with the outer cavity 52 and the inlet 92. This fluid path defines an inlet side of the filter element 10 and filter head 90. As such, the inlet flow 110 flows through the inlet ports 70 and generally between the second and third seals 74, 76.

Thus, in the embodiment shown, the filter cartridge 40 is adapted to filter fluid as it flows radially in an outside-to-inside direction. In other embodiments, a filter cartridge may be adapted to filter fluid from an inside to outside direction. In such an alternative embodiment, the flow opening 62 would be arranged in operable fluid communication with an inlet, and the inlet ports 70 would be arranged in operable fluid communication with an outlet.

Thus the first and second seals 72, 74 help to prevent fluid communication between an inlet side of the filter (including the inlet 94, the inlet ports 70, and the outer cavity 52) and an outlet side of the filter (including the inner cavity 50, the flow opening 62, and the outlet 64). The third seal 76 helps to prevent fluid communication between the inlet side of the filter and the exterior of the outer housing 12.

Optionally, a fourth seal 78 may also be retained between the sidewall 15 and an outer peripheral surface of the outer mounting portion 64. This seal 78 prevents fluid communication between the inlet side of the filter element and the exterior of the outer housing 12.

The various seals disclosed herein are preferably an o-ring type seal having circular or rectangular cross-sectional profiles, but other suitable types of seals such as chevron-shaped seals and wiper seals are also contemplated.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element adapted to removably engage a filter head having an inlet and an outlet, the filter element comprising:

an outer housing;
a filter cartridge non-removably secured within the outer housing, having:
an open end cap defining a central aperture;
a closed end cap; and
a tubular ring of filter media extending axially along a longitudinal axis between the open and closed end caps and around the longitudinal axis, and defining an inner cavity, and further defining an outer cavity between the outer housing and an outer periphery of the filter media, wherein an inlet side of the filter element comprises the outer cavity, and an outlet side of the filter element comprises the inner cavity;
a baseplate having a one-piece construction, non-removably secured within the outer housing and permitting flow between the inlet and the inlet side through at least one inlet port;
a first seal retained between and sealing the open end cap to the baseplate to prevent fluid from flowing between the inlet and outlet sides by bypassing the filter media;
a second seal retained by the baseplate configured to seal with a first sealing surface of a filter head;
a third seal retained by the baseplate configured to seal with a second sealing surface of a filter head;
a fourth seal retained between the baseplate and the outer housing, arranged to limit fluid communication between the inlet side and an exterior of the housing;
wherein the baseplate includes a first flow opening, a seal mount portion, an outer mounting portion configured for removably engaging the filter head, and a retainer portion adapted to non-removably secure the filter cartridge within the outer housing; and wherein the seal mount portion extends axially away from the open and closed end caps, and defines a radially outwardly opening groove adapted to axially retain and radially support the second seal.

2. The filter element of claim 1, wherein the second seal is arranged to prevent fluid communication between the inlet side and outlet side, and the third seal is arranged to limit fluid communication between the inlet side and an exterior of the outer housing.

3. The filter element of claim 1, wherein the outer housing defines a lip portion, and wherein the lip portion partially axially abuts the baseplate to non-removably secure the baseplate within the housing.

4. The filter element of claim 1, wherein the at least one inlet port is a plurality of inlet ports spaced around and radially outside the first flow opening, the at least one inlet port opening fluidly communicating with the outer cavity.

5. The filter element of claim 1, wherein the outer mounting portion has a threaded portion adapted to threadably engage the filter head.

6. The filter element of claim 1, wherein the retaining portion axially abuts the open end cap to non-removably secure the filter cartridge within the outer housing.

7. The filter element of claim 1, wherein the outer mounting portion defines an inwardly opening groove adapted to retain the third seal.

8. The filter element of claim 1, wherein the central aperture of the open end cap is surrounded by an axially depending portion and a radially inwardly extending portion attached to the axially depending portion, forming a stepped configuration therewith, adapted to axially and radially support the first seal.

9. The filter element of claim 1, wherein the first flow opening is surrounded by an annular extending portion, the annular extending portion extending axially through the central aperture of the open end cap, such that a distal end is positioned axially between the open and closed end caps, and wherein the annular extending portion provides an axial sealing surface and a radial sealing surface for the first seal.

10. The filter element of claim 1, wherein the second seal surrounds the seal mount portion.

11. The filter element of claim 1, wherein the flow opening of the baseplate is defined by an axially extending annular portion, the axially extending annular portion having an outer peripheral first seal sealing surface for the first seal;

wherein the seal mount portion defines a second seal sealing surface for the second seal; and wherein the second seal sealing surface is radially outward relative to the longitudinal axis from the outer peripheral first seal sealing surface.

12. The filter element of claim 1, wherein the radially outwardly opening groove extends radially away from the longitudinal axis.

13. A filter element, comprising:

an outer housing having a closed end and an open end, and a sidewall extending therebetween, the sidewall defining a lip at the open end;

a filter cartridge non-removably secured within the outer housing, including:
an open end cap having a central aperture;
a closed end cap; and
filter media extending between the open and closed end caps and around and along a longitudinal axis, defining an inner cavity, and further defining an outer cavity between the sidewall and an outer periphery of the filter media;

a baseplate having a one-piece construction non-removably secured within the outer housing, defining:
a first flow opening defined by an axially extending annular portion, the first flow opening in fluid communication with the inner cavity;
an axially extending seal mount portion;
an outer mounting portion, adapted to removably mount the filter element to a filter head, the outer mounting portion axially abutting the lip to non-removably secure the baseplate within the outer housing;
at least one inlet port in fluid communication with the outer cavity; and
a retainer portion between the axially extending seal mount and the outer mounting portion securely retaining the filter cartridge within the outer housing;

a first seal sealing between the open end cap and an outer peripheral surface of the axially extending annular portion;

a second seal adapted to radially seal between the axially extending seal mount portion and a first sealing surface of a filter head;

a third seal adapted to seal between the outer mounting portion and a second sealing surface of the filter head; and a fourth seal retained between the baseplate and the outer housing, arranged to limit fluid communication between the inlet side and an exterior of the housing; and wherein the axially extending seal mount portion defines a radially outwardly opening groove, adapted to retain the second seal.

14. The filter element of claim 13, wherein the at least one inlet port is a plurality of inlet ports, spaced around and radially outside the first flow opening.

15. The filter element of claim 13, wherein the axially extending annular portion depends from the retainer portion and extends axially through the central aperture such that it is at least in part surrounded by filter media.

16. The filter element of claim 13, wherein the outer mounting portion is threaded, and adapted to threadably engage the filter head.

17. The filter element of claim 13, wherein the second seal surrounds the seal mount portion.

18. The filter element of claim 13, wherein the flow opening of the baseplate is defined by an axially extending annular portion, the axially extending annular portion having an outer peripheral first seal sealing surface for the first seal;

wherein the seal mount portion defines a second seal sealing surface for the second seal; and wherein the second seal sealing surface is radially outward relative to the longitudinal axis from the outer peripheral first seal sealing surface.

19. The filter element of claim 13, wherein the radially outwardly opening groove extends radially away from the longitudinal axis.

20. A filter, comprising:
a filter head having an inlet and an outlet and defining a radially inward facing first sealing surface and a radially outward facing second sealing surface;
a filter element, removably attached to the filter head, the filter element further having:
an outer housing;
a filter cartridge non-removably secured within the outer housing, the filter cartridge having:
an open end cap;

a closed end cap; and filter media extending between the open and closed end caps along and around a longitudinal axis, the filter media defining an inner cavity, and further defining an outer cavity between the outer housing and an outer periphery of the filter media;

an inlet side, comprising the outer cavity;

an outlet side, comprising the inner cavity;

a baseplate having a one-piece construction, non-removably secured within the outer housing and permitting flow between the inlet and the inlet side through at least one inlet port;

a first seal retained between the open end cap and the baseplate to seal the baseplate to the open endcap and prevent bypass between the inlet and the outlet sides;

a second seal retained between the baseplate and the first sealing surface of the filter head; and a third seal retained between the baseplate and the second sealing surface of the filter head;

wherein the first and second seals are arranged to limit fluid communication between the inlet side and outlet side, and the third seal is arranged to limit fluid communication between the inlet side and an exterior of the outer housing a fourth seal retained between the baseplate and the outer housing, arranged to limit fluid communication between the inlet side and an exterior of the housing, wherein the baseplate includes a first flow opening, a seal mount portion, an outer mounting portion configured for removably the filter head, and a retainer portion adapted to non-removably secure the filter cartridge within the outer housing; and wherein the seal mount portion extends axially away from the open and closed end caps, and defines a radially outwardly opening groove adapted to axially retain and radially support the second seal.

21. The filter of claim 20, wherein the outer housing defines a radially outwardly protruding portion and a lip portion, and wherein the radially outwardly protruding portion and the lip portion partially envelop and an outer peripheral surface of the baseplate to non-removably secure the baseplate within the housing.

22. The filter of claim 20, wherein the at least one inlet port is a plurality of inlet ports spaced around and radially outside the first flow opening.

23. The filter of claim 20, wherein the outer mounting portion has a threaded portion threadably engaging the filter head.

24. The filter element of claim 20, wherein the second seal surrounds the seal mount portion.

25. The filter element of claim 20, wherein the flow opening of the baseplate is defined by an axially extending annular portion, the axially extending annular portion having an outer peripheral first seal sealing surface for the first seal;

wherein the seal mount portion defines a second seal sealing surface for the second seal; and wherein the second seal sealing surface is radially outward relative to the longitudinal axis from the outer peripheral first seal sealing surface.

26. The filter element of claim 20, wherein the radially outwardly opening groove extends radially away from the longitudinal axis.

* * * * *